ELECTROLUMINESCENT JUNCTION DEVICE INCLUDING A BISMUTH DOPED GROUP III(a)-V(a) COMPOSITION

Filed April 26, 1966

INVENTORS: M. GERSHENZON
D. G. THOMAS
F. A. TRUMBORE

BY Edward M. Fink

ATTORNEY

United States Patent Office 3,414,441

Patented Dec. 3, 1968

3,414,441

**ELECTROLUMINESCENT JUNCTION DEVICE INCLUDING A BISMUTH DOPED GROUP III(*a*)–V(*a*) COMPOSITION**

Murray Gershenzon, Morris Plains, and David G. Thomas and Forrest A. Trumbore, Summit, N.J., assignors to Bell Telephone Laboratories, Incorporated, New York, N.Y., a corporation of New York Filed Apr. 26, 1966, Ser. No. 545,291
3 Claims. (Cl. 148—33)

ABSTRACT OF THE DISCLOSURE

An electroluminescent p-n junction device including a bismuth doped Group III(*a*)–V(*a*) composition, consisting of (a) the nitrides of gallium, aluminum, indium and boron, (b) the phosphides of gallium, aluminum, boron and indium, or (c) Group III(*a*)–V(*a*) compound mixtures, with bismuth being present in an amount ranging from $10^{16}$–$10^{19}$ atoms per cubic centimeter.

Figure 1A:
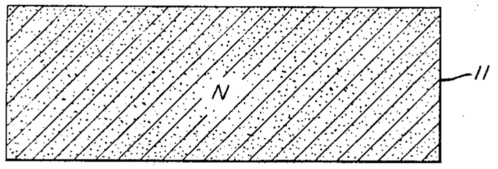

This invention relates to a technique for the growth of compositions useful in electroluminescent devices and to such devices. More particularly, the present invention relates to a technique for the growth of bismuth doped Group III(*a*)–V(*a*) semiconductive compositions and to electroluminescent junction devices utilizing such compositions. Further, the invention relates to a novel technique for the growth of gallium phosphide of enhanced crystal volume.

Recently, there has been a birth of interest in a class of junction devices which evidence "isoelectronic traps" that function as radiative centers, so causing luminescence at the junction. There has been speculation by workers in the art regarding the nature of these traps, but it is presently the general consensus that they are impurity centers which manifest the characteristic of binding a hole and an electron with a finite energy even though they themselves possess neither a net charge nor a bound hole or electron and which are capable of providing a path for the radiative recombination of the trapped hole and electron.

In accordance with the present invention a technique is described for the growth of bismuth doped Group III(*a*)–V(*a*) compositions evidencing the wurtzite and zincblende structures containing III(*a*)–V(*a*) mixtures, the nitrides of gallium, aluminum, indium and boron, or the phosphides of gallium, aluminum, boron and indium, bismuth being present in an amount ranging from $10^{16}$ to $10^{19}$ atoms per cubic centimeter. A prime example of such mixtures are gallium arsenside-gallium phosphide alloys. The inventive technique also relates to the use of such compositions in novel two terminal p-n junction devices. Bismuth doped gallium phosphide compositions prepared in accordance with the described techniques have been found to emit orange light over the range of 1.9 to 2.1 electron volts (5900 A. to 6500 A.) at room temperature, and yellow light at 20° K. over the range of 2.0 to 2.2 electron volts (6200 A. to 5640 A.).

The invention will be more readily understood by reference to the following detailed description taken in conjunction with the accompanying drawing, wherein:

FIGS. 1A through 1E are cross-sectional views in successive stages of manufacture of an electroluminescent junction device of the present invention.

For purposes of exposition, the present invention has been described largely in terms of the growth of bismuth doped gallium phosphide. However, it is to be understood by those skilled in the art that the process steps may be applied equally as well to the entire range of Group III(*a*)–V(*a*) materials alluded to hereinabove. Additionally, it will be understood that the various parameters of the steps discussed are not critical nor is the particular growth technique critical, the essence of the inventive technique residing in the use of the requisite amounts of the desired impurities. For illustrative purposes, the growth process will be described in terms of slow cooling of Group III(*a*) element-bismuth melts containing crystals of the desired composition.

With reference now to the growth process, the first step involves preparing a melt of a Group III(*a*) element selected from among gallium, aluminum, indium, or boron, alone or in combination with bismuth in an amount such that the composition of the resultant solution will range from 0.01 to 99 percent by weight bismuth. It will be understood that the upper limit is not absolute and is merely dictated by practical considerations. Thus, it is apparent that the starting solution may be approximately pure bismuth or combinations thereof with the noted Group III(*a*) elements.

To this end, a suitable charge of gallium (the illustrative example being directed to growth of gallium phosphide in gallium-bismuth solutions) is placed in a silica tube or other suitable vessel and heated under vacuum to a temperature sufficient to form a melt. Next, the vessel is removed from the vacuum system and gallium phosphide, together with the requisite amount of bismuth plus any other desired dopants are added. It will be appreciated that the bismuth could have been added initially but for convenience is added with the gallium phosphide.

Following, the vessel and its contents are evacuated and sealed under vacuum. Then, the mixture is heated to a temperature above its melting point and maintained thereat for a time period ranging from one to twelve hours. Thereafter, the temperature of the tube and its contents is lowered at a rate ranging from ½ to 60° C. per hour to about 900° C., the heating unit being turned off at that point and the vessel permitted to cool to room temperature.

The desired bismuth doped gallium phosphide crystals containing from $10^{16}$–$10^{19}$ atoms per cubic centimeter of bismuth may then be recovered by any conventional procedure, as for example, by digestion in nitric or hydrochloric acids. It will be appreciated that any of the well known donors may be added with the gallium phosphide, for example, tellurium, sulphur, selenium, and so forth, in order to control the conductivity type of the resultant crystal. As described herein, the procedure is directed to the preparation of n-type crystals but p-type crystals can also be utilized without destroying the novel electroluminescence phenomenon.

Another aspect of the invention lies in the fact that the described technique results in the enhancement of the average crystal volume of gallium phosphide as compared with such crystals grown by prior art techniques. Thus, it has been found that the described bismuth additions result in gallium phosphide crystal volume approximately five times greater and higher than crystal volume of gallium phosphide prepared in the absence of the bismuth. It will be understood by those skilled in the art that variations in crystal growth parameters will alter this value.

A suitable crystal having been prepared, the next step in the inventive procedure involves the preparation of a two terminal junction device.

Figure 1B:
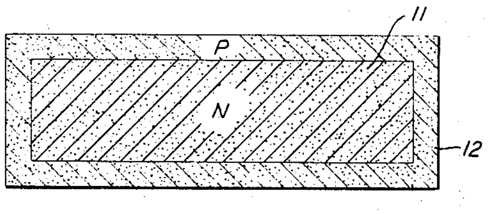

With further reference now to the drawing, FIG. 1A shows a bismuth doped n-type gallium phosphide crystal 11 prepared as described. As a preliminary step, it is important to rid the surface of the crystal of all traces of undesirable impurities. To this end, the crystal is advantageously etched in aqua regia for 10 to 15 seconds, so preparing it for the formation of a surface diffusion layer of p-type conductivity. The crystal is then loaded into a silica tube containing a charge of zinc, the tube flamed, evacuated to a pressure of the order of approximately 1 micron and sealed under vacuum. Then, the tube is heated at about 700° C. for a time period ranging from 10 to 20 hours. FIG. 1B shows the resultant crystal 11 over whose surface there is formed a p-type diffusion zinc layer 12.

Figure 1C:
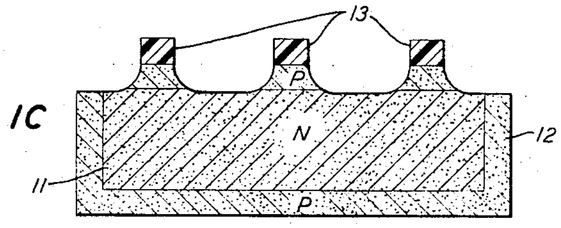
Figure 1D:
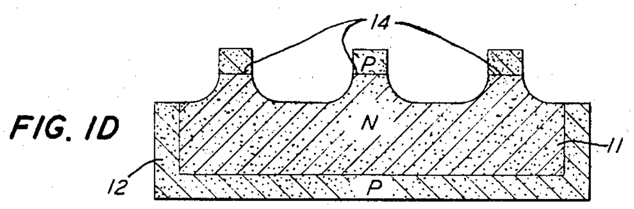
Figure 1E:
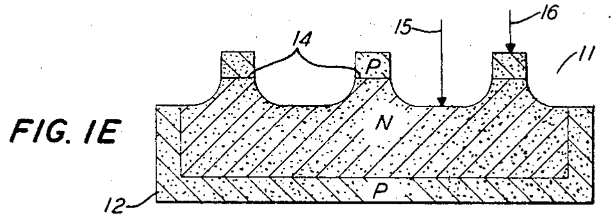

Next, wax dots are formed upon the surface of layer 12 by conventional techniques and the crystal sandblasted to form mesas 13 (FIG. 1C). The crystal is again etched in aqua regia for about 45 seconds to remove the wax and any surface damage, thereby resulting in a structure containing p-n junctions 14 as shown in FIG. 1D. Finally, point contacts 15 and 16 are made to the p and n regions respectively, by conventional procedures (FIG. 1E).

An example of the application of the present invention is set forth below. It is intended merely as an illustration, and it is to be appreciated that the methods described may be varied by one skilled in the art without departing from the spirit and scope of the invention.

Example

A bismuth doped gallium phosphide crystal and electroluminescent junction device were prepared as follows:

12.5 grams of gallium were placed in a silica tube and the tube heated under vacuum to about 600° C. The tube was then removed from the vacuum system and 1.5 grams of gallium phosphide, 2.0 grams of bismuth, and 0.0023 gram of tellurium were added to the resultant solution. Next, the tube was evacuated, sealed under vacuum, and placed in a furnace wherein the temperature of the tube and its contents was elevated to the melting point thereof (1150° C.). The resultant melt was maintained at this temperature for two hours. Thereafter, the temperature of the tube and its contents was lowered at 5° C. per hour to 900° C., at which point the furnace was turned off and the vessel permitted to cool to room temperature. The resultant n-type bismuth doped gallium phosphide crystal 250 x 250 x 50 mils in thickness containing approximately $3\times10^{17}$ atoms per cubic centimeter of bismuth was recovered by digestion in nitric acid. For comparative purposes, the described procedure was repeated in the absence of the bismuth addition, so resulting in a crystal 200 x 200 x 15 mils in thickness.

The crystal was etched for 15 seconds in aqua regia and placed in a silica tube containing 1 milligram of zinc. The tube was flamed, evacuated, and sealed under vacuum. Next, the tube was placed in a furnace and heated to 700° C. and maintained thereat for 17 hours. The crystal was then removed from the tube, wax dots formed on the surface thereof, and sandblasted by conventional techniques to form mesas 10 mils in diameter. Then the crystal was etched in aqua regia for 45 seconds to remove the wax and any surface damage. Finally, metallic point contacts were made to the p and n regions respectively.

In order to demonstrate the efficacy of the resultant device, the leads were connected to a D-C source under forward bias conditions, the plus lead to the p region and the minus lead to the n region. At room temperature, at voltages ranging from 1.5 to 4.0 volts, the device was found to carry from $10^{-9}$ to $5\times10^{-2}$ amperes accompanied by the emission of orange light centered at about 2.0 electron volts (6200 A.), encompassing the range from 1.9 to 2.1 electron volts (5900 A. to 6500 A). The measured external quantum efficiency, as determined by means of a calibrated solar cell was found to be $10^{-5}$ or 0.001 percent. At 20° K., the light emission was yellow and centered at about 2.1 electron volts, an efficiency of approximately 3 percent obtaining.

What is claimed is:

1. A p-n junction device including a bismuth doped Group III(*a*)–V(*a*) composition evidencing wurtzite and zincblende structures selected from the group consisting of (a) the nitrides of gallium, aluminum, indium and boron, (b) the phosphides of gallium, aluminum, boron and indium and (c) Group III(*a*)–V(*a*) compound mixtures, bismuth being present in an amount ranging from $10^{16}$–$10^{19}$ atoms per cubic centimeter.

2. A device in accordance with claim 1 wherein said Group III(*a*)–V(*a*) composition is gallium phosphide.

3. A device in accordance with claim 1 including means for passing current therethrough.

References Cited

UNITED STATES PATENTS 3,065,112 11/1962 Gilles et al.

L. DEWAYNE RUTLEDGE, *Primary Examiner.*

R. A. LESTER, *Assistant Examiner.*